United States Patent Office 3,260,644
Patented July 12, 1966

3,260,644
POLYMETHYL-1,4-BENZOQUINONE MONOXIMES AS FUNGICIDES
Bogislav von Schmeling, Hamden, Conn., assignor to United States Rubber Company, New York, N.Y., a corporation of New Jersey
No Drawing. Filed Dec. 30, 1963, Ser. No. 334,651
20 Claims. (Cl. 167—30)

This invention relates to fungicides, and particularly to seed protectants and soil fungicides for protecting seeds and seedlings emerging from seeds against attack by fungi.

The fungicides of the present invention are the polymethyl-1,4-benzoquinone monoximes which may be represented by the general formula:

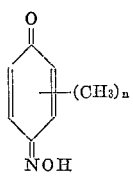

where $n$ is 2 to 4. The polymethyl-1,4-benzoquinone monoximes may be applied as such, or as an alkali (alkali-metal, ammonium or amine) salt, e.g. where the monoxime is reacted with the alkali in aqueous solution.

It has been found that polymethyl-1,4-benzoquinone monoximes are particularly effective in controlling soil diseases caused by Rhizoctonia solani.

The chemical may be applied to seeds by tumbling the chemical with the seeds, either alone or in admixture with powdered solid carrier, to coat the seeds. Typical powdered solid carriers are the various mineral silicates, e.g. mica, talc, pyrophyllite, and clays. The chemical may also be applied to the seeds in admixture with a conventional surface-active wetting agent, with or without additional powdered solid carrier, as by first wetting the mixture with a small amount of water and then tumbling the seeds in the slurry. The surface-active wetting agents that may be used with the chemical may be any of the conventional anionic, non-ionic, or cationic surface-active agents. Such surface-active agents are well known and reference is made to U.S. Patent No. 2,547,724, columns 3 and 4, for detailed examples of the same. As a seed protectant, the amount of the chemical coated on the seeds will be 0.5 to 10 ounces per hundred pounds of the seed. As a soil fungicide, the chemical may be applied as a dust in admixture with sand or dirt or a powdered solid carrier such as a mineral silicate, with or without an additional surface-active wetting agent, to the furrows with the planting of the seeds, or the chemical may be applied as an aqueous spray, if desired, including a surface-active dispersing agent or a surface-active dispersing agent and a powdered solid carrier, to the seed rows before, or with, or after planting the seeds. As a soil fungicide, the amount of the chemical applied to the seed rows will be from ¼ to 5 pounds per acre applied to the seed rows the equivalent of an area 2" wide and 2" deep to parallel rows in one direction a distance of 40" apart. Also, as a soil fungicide, the chemical may be applied broadcast as a similar dust or spray with an application rate of 10 to 200 pounds per acre. The chemicals of the invention may be mixed with plant growth regulants and herbicides and various pesticides, such as bactericides, insecticides, nematocides, and other fungicides.

The following examples illustrate the invention. Parts referred to herein are by weight.

Example 1

This example evaluates the chemicals of the present invention as seed protectants and soil fungicides as measured by their ability to prevent post-emergence damping-off of cotton seedlings by the following test:

Sixty-six mg. of the chemical were thoroughly mixed in a glass jar with one pound of clean, dry sand. The mixing was accomplished by vigorously shaking the jar which was covered with a screwcap. This masterbatch was then thoroughly mixed with 6¼ pounds of soil to give a 20 p.p.m. (parts per million) concentration of chemical in the soil-sand mixture. The treated soil was then placed into five 4" diameter pots in which 5 cotton seeds, Variety Fox-4, per pot were planted. Before covering the planted seed the pots were inoculated by placing a grain of oats, infested with Rhizoctonia solani Kühn from a two week old culture, in the center of each pot surrounded by the cotton seed. The seed and the inoculum were then covered with a layer of soil about ½" thick. Five replications were used giving a total of 25 seeds for each chemical treatment. An untreated check, replicated five times, in which seeds were planted and the inoculum of Rhizoctonia solani was placed on the soil in the center of the 4" pot but without the chemical treatment, was included in the test. Also a check, replicated five times, was included where seeds were planted in soil without chemical treatment and without the inoculum of the organism. After the planting was completed the pots were then transferred to the greenhouse, watered and kept under warm and moist conditions by using sub-irrigation and temperature control in maintaining 72° F. to 78° F. soil temperature. Results were taken two to three weeks later by counting the number of emerged and surviving cotton seedlings. The percent stand of cotton seedlings is calculated using the following formula:

$$\text{Percent stand} = \frac{\text{number of seedlings surviving}}{\text{number of seedlings emerged}} \times 100$$

The following table gives the percent emergence and percent stand of cotton seedlings for chemical treatment with 2,5-dimethyl-1,4-benzoquinone and 2,6-dimethyl-1,4-benzoquinone at a concentration of 20 p.p.m., which is equivalent to an application rate of 0.6 pound/acre of the chemicals applied to the seed rows the equivalent of an area 2" wide and 2" deep to parallel rows in one direction a distance of 40" apart as compared to the untreated inoculated and untreated, uninoculated soil checks.

| Chemical | Percent Emergence | Percent Stand |
|---|---|---|
| 2,5-dimethyl-1,4-benzoquinone monoxime | 80 | 76 |
| 2,6-dimethyl-1,4-benzoquinone monoxime | 84 | 76 |
| Untreated inoculated soil (check) | 76 | 0 |
| Untreated uninoculated soil (check) | 92 | 92 |

The following table shows results of a similar test on 2,3,5-trimethyl-1,4-benzoquinone monoxime at concentration of 20 p.p.m. and 2,3,5,6-tetramethyl-1,4-benzoquinone monoxime at 80 p.p.m.:

| Chemical | Percent Emergence | Percent Stand |
|---|---|---|
| 2,3,5-trimethyl-1,4-benzoquinone monoxime | 72 | 68 |
| 2,3,5,6-tetramethyl-1,4-benzoquinone monoxime | 80 | 76 |
| Untreated inoculated soil (check) | 42 | 0 |
| Untreated uninoculated soil (check) | 88 | 88 |

The following table shows results of a similar test on a mixture of 20 p.p.m. of 2,5-dimethyl-1,4-benzoquinone monoxime and 20 p.p.m. of tetramethyl thiuram disulfide (a known fungicide) and on a mixture of 10 p.p.m. of 2,5-dimethyl-1,4-benzoquinone monoxime and 20 p.p.m. of tetramethyl thiuram disulfide:

| Chemical | Percent Emergence | Percent Stand |
| --- | --- | --- |
| 20 p.p.m. of 2,5-dimethyl-1,4-benzoquinone monoxime+20 p.p.m. of tetramethyl thiuram disulfide | 82 | 93 |
| 10 p.p.m. of 2,5-dimethyl-1,4-benzoquinone monoxime+20 p.p.m. of tetramethyl thiuram disulfide | 82 | 66 |
| Untreated inoculated soil (check) | 86 | 7 |
| Untreated uninoculated soil (check) | 84 | 98 |

*Example 2*

This example illustrates the effectiveness of 2,6-dimethyl-1,4-benzoquinone monoxime as a seed protectant and soil fungicide by its disease control of seeds planted in infested soil as follows:

Two hundred and sixty-four mg. of the chemical were thoroughly mixed in a glass jar with one pound of clean, dry sand. This masterbatch was then mixed with 6¼ pounds of infested soil to give an 80 p.p.m. concentration of chemical in the soil-sand mixture. The soil used for the chemical treatment was highly infested with a complex of organisms which cause rotting of seeds such as *Pythium* spp. *Fusarium* spp., and *Rhizoctonia* spp. The incorporation of the masterbatch containing the chemical into the infested soil took place in a tumbler which was allowed to rotate for five minutes for each mixing operation. This mixing time gave a thorough and even incorporation of the chemical into the infested soil. The treated soil was then placed into five 4″ diameter pots in which five pea seeds per pot were planted about ½″ deep covered with the infested, treated soil, i.e., a total of 25 seeds were planted for each chemical soil treatment. An untreated check, replicated five times, in which seeds were planted in the same infested soil but without the chemical treatment was included in the test. Also a check, replicated five times, was included where seeds were planted in sterilized soil without chemical treatment. After the planting was completed, the pots were placed in a cold chamber at 45° F. for a period of 10 days for the purpose of producing favorable conditions for the soil organisms and unfavorable conditions for the seed. After that time the pots were then transferred to the greenhouse and kept under moist conditions. The results were taken ten to fourteen days later by counting the number of emerged pea seedlings.

The formula for the determination of the percent disease control is:

$$\text{Percent control} = \frac{A-B}{C-B} \times 100$$

where
$A$=percent germination in chemically treated infested soil.
$B$=percent germination in untreated infested soil.
$C$=percent germination in untreated sterile soil.

The 2,6-dimethyl-1,4-benzoquinone monoxime gave 100 percent disease control at a concentration in soil at 80 p.p.m., which is equivalent to an application rate of 2.4 lbs./acre of the chemical applied to seed rows the equivalent of an area 2″ wide and 2″ deep to parallel rows in one direction at a distance of 40″ apart.

*Example 3*

This example illustrates the effectiveness of the chemicals of the present invention as seed protectants.

Eighty-eight mg. of a 75% active wettable powder formulation of 2,5-dimethyl-1,4-benzoquinone monoxime as shown in Example 4 below were tumbled with 100 grams of corn seed for 45 minutes. This is equivalent to a rate of one ounce of the chemical per 100 pounds of seed. Rates of 0.5 ounce and 2 ounces per 100 pounds of seed were also tested. In each test, six rows of 25 seeds in each row were planted in highly infested soil similar to that used in Example 2 in greenhouse flats, watered, and placed in a control chamber at 50° F. and 100% relative humidity for a period of two weeks. Six rows of 25 seeds each, not treated with the chemical, were also planted as an untreated check. The flats were then transferred to the greenhouse and the results were taken about 10 days later. They are expressed in percent germination by using the following formula:

Percent germination=

$$\frac{\text{Number of emerged seedlings}}{\text{Number of seeds planted}} \times 100$$

The results were 69.3%, 90.7% and 87.3% germination for application rates of 0.5, 1.0 and 2.0 ounces of the 2,5-dimethyl-1,4-benzoquinone monoxime per 100 pounds of seed, respectively, and 42.0% for the untreated check.

*Example 4*

The following wettable powder formulation was used in Example 3:

| | Parts |
| --- | --- |
| 2,5-dimethyl-1,4-benzoquinone monoxime | 75 |
| Dixie clay | 12 |
| Polyfon H | 2 |
| Triton X–120 | 5 |
| Ethylene glycol | 6 |

"Dixie clay" is a powdered kaolin hard clay. "Polyfon H" is the trade name of sodium lignosulfonate anionic wetting and dispersing agent. "Triton X–120" is the trade name for an alkyl aryl polyether alcohol type nonionic wetting and dispersing agent.

In wettable powder formulations, the powdered solid carriers such as clay and other mineral silicates, will generally be used in ratios from 1/10 part to 3 parts per part of the polymethyl-1,4-benzoquinone monoxime.

*Example 5*

The following is a typical dust formulation of the active chemical.

| | Parts |
| --- | --- |
| 2,6-dimethyl-1,4-benzoquinone monoxime | 10 |
| Talc | 90 |

In dust formulations, the powdered solid carriers will generally be from 3 to 50 parts per part of the active chemical.

From Examples 4 and 5, it may be seen that the ratio of powdered solid carrier such as a mineral silicate to active ingredient may be in the range of 1/10 to 50 parts per part of the active ingredient.

*Example 6*

The following formulation shows a typical composition of an emulsifiable concentrate:

| | Parts |
| --- | --- |
| 2,6-dimethyl-1,4-benzoquinone monoxime | 20 |
| Emcol H 5003 | 10 |
| Isooctyl alcohol | 50 |
| Diacetone | 20 |

"Emcol H 5003" is the trade name under which an anionic dispersing agent of the type consisting of a blend of oil soluble calcium sulfonate with polyoxyethylene ethers in sold.

Such emulsifiable concentrates may be used to make an aqueous dispersion of the active ingredient at the desired concentration for application to seeds or soil.

Example 7

The following formulations show typical compositions of polymethyl-1,4-benzoquinone monoximes in the form of water-soluble alkali salts:

| | Parts |
|---|---|
| Sodium salt: | |
|   2,5-dimethyl-1,4-benzoquinone monoxime | 22 |
|   Sodium hydroxide | 6 |
|   Water | 72 |
| Ammonium salt: | |
|   2,6-dimethyl-1,4-benzoquinone monoxime | 45 |
|   Ammonium hydroxide | 18 |
|   Water | 250 |
| Amine salt: | |
|   2,5-dimethyl-1,4-benzoquinone monoxime | 45 |
|   Trimethylamine | 30 |
|   Water | 250 |

Such formulations may be diluted with water to the desired concentration of the active ingredient for application to seeds or soil.

Having thus described my invention, what I claim and desire to protect by Letters Patent is:

1. The method of controlling fungi with comprises bringing fungi into contact with polymethyl-1,4-benzoquinone monoxime.

2. The method of controlling fungi which comprises bringing fungi into contact with 2,5-dimethyl-1,4-benzoquinone monoxime.

3. The method of controlling fungi which comprises bringing fungi into contact with 2,6-dimethyl-1,4-benzoquinone monoxime.

4. The method of controlling fungi in soil which comprises bringing fungi in soil in contact with polymethyl-1,4-benzoquinone monoxime.

5. The method of protecting seeds and seedlings emerging from seeds against attack by fungi which comprises bringing the seeds into contact with polymethyl-1,4-benzoquinone monoxime.

6. The method of protecting seeds and seedlings emerging from seeds against attack by fungi which comprises bringing the seeds into contact with 2,5-dimethyl-1,4-benzoquinone monoxime.

7. The method of protecting seeds and seedlings emerging from seeds against attack by fungi which comprises bringing the seeds into contact with 2,6-dimethyl-1,4-benzoquinone monoxime.

8. The method of protecting seeds and seedlings emerging from seed against attack by fungi which comprises coating the seeds with polymethyl-1,4-benzoquinone monoxime.

9. The method of protecting seeds and seedlings emerging from seeds against attack by fungi which comprises applying polymethyl-1,4-benzoquinone monoxime to soil in the area in which seeds are planted before germination of seeds.

10. The method of protecting seeds and seedlings emerging from seeds against attack by fungi which comprises applying polymethyl-1,4-benzoquinone monoxime to soil in the area in which seeds are planted before emergence of seedlings.

11. The method of protecting seeds and seedlings emerging from seeds against attack by fungi which comprises applying 2,5-dimethyl-1,4-benzoquinone monoxime to soil in the area in which seeds are planted before emergence of seedlings.

12. The method of protecting seeds and seedlings emerging from seeds against attack by fungi which comprises applying 2,6-dimethyl-1,4-benzoquinone monoxime to soil in the area in which seeds are planted before emergence of seedlings.

13. The method of protecting seeds and seedlings emerging from seeds against attack by fungi which comprises applying polymethyl-1,4-benzoquinone monoxime to seed rows in soil at a rate of ¼ to 5 pounds per acre applied to the seed rows the equivalent of an area 2″ wide and 2″ deep to parallel rows in one direction at a distance of 40″ apart.

14. The method of protecting seeds and seedlings emerging from seeds against attack by fungi which comprises applying polymethyl-1,4-benzoquinone monoxime broadcast to soil in the area in which seeds are planted at an application rate of 10 to 200 pounds per acre.

15. A fungicidal composition comprising polymethyl-1,4-benzoquinone monoxime and a powdered solid carrier.

16. A fungicidal composition comprising polymethyl-1,4-benzoquinone monoxime and a powdered mineral silicate.

17. A fungicidal composition comprising polymethyl-1,4-benzoquinone monoxime and a powdered mineral silicate, the powdered mineral silicate being in the range of 1/10 to 50 parts per part of the polymethyl-1,4-benzoquinone monoxime.

18. A fungicidal composition comprising 2,5-dimethyl-1,4-benzoquinone monoxime and a powdered mineral silicate, the powdered mineral silicate being in the range of 1/10 to 50 parts per part of the 2,5-dimethyl-1,4-benzoquinone monoxime.

19. A fungicidal composition comprising 2,6-dimethyl-1,4-benzoquinone monoxime and a powdered mineral silicate, the powdered mineral silicate being in the range of 1/10 to 50 parts per part of the 2,6-dimethyl-1,4-benzoquinone monoxime.

20. A fungicidal composition comprising polymethyl-1,4-benzoquinone monoxime, a solid carrier, and a surface-active wetting and dispersing agent.

No references cited.

JULIAN S. LEVITT, *Primary Examiner.*

VERA C. CLARKE, *Assistant Examiner.*